(No Model.)
C. DÉGRANGE.
CART WHEEL.
No. 283,867. Patented Aug. 28, 1883.
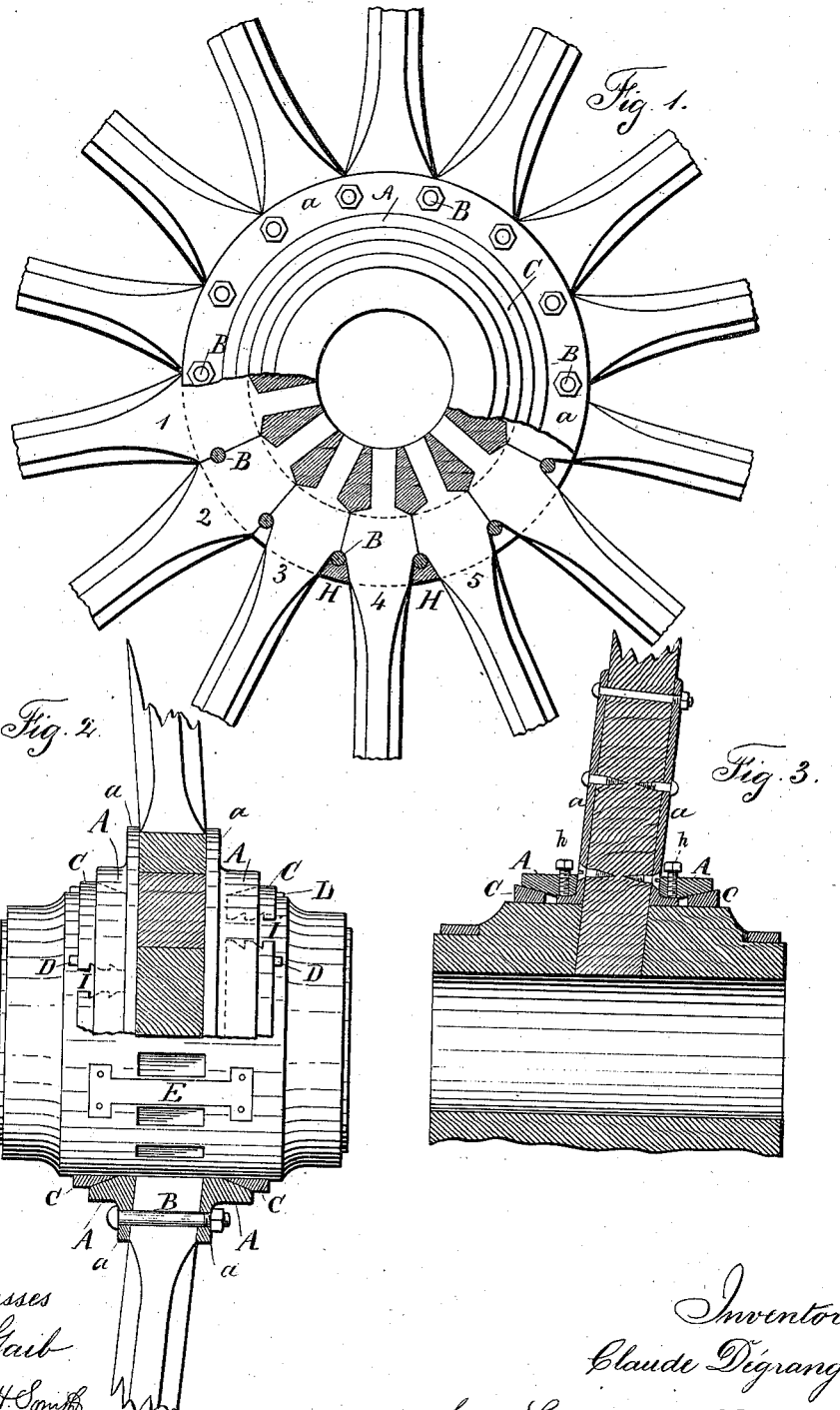

UNITED STATES PATENT OFFICE.

CLAUDE DÉGRANGE, OF LYONS, FRANCE.

CART-WHEEL.

SPECIFICATION forming part of Letters Patent No. 283,867, dated August 28, 1883.

Application filed May 1, 1883. (No model.) Patented in France January 12, 1882, No. 146,803, and in Belgium February 20, 1882, No. 57,124.

*To all whom it may concern:*

Be it known that I, CLAUDE DÉGRANGE, a citizen of the French Republic, now residing at Lyons, France, have invented an Improvement in Cart-Wheels, of which the following is a specification. Letters Patent for this invention have been granted to me in France, January 12, 1882, No. 146,803, and in Belgium, February 20, 1882, No. 57,124.

Previous to my invention metal bands or rings had been applied to the wooden hubs of wheels to strengthen the same, and said rings have had flanges thereon to receive between them the bases of the spokes.

My invention consists in combining with said flanged rings means for keeping the rings firm upon the wooden hub, so that in case of contraction of the hub there will be no looseness of said rings on the hub, and consequently no looseness or play of the spokes. To accomplish this object I make the interior of the rings of conical form and provide ring-wedges between the hub and rings, so that by driving in these wedges from time to time, as rendered necessary by the contraction of the hub, the rings are securely clamped to the hub, and all looseness of the parts is prevented.

In the drawings, Figure 1 is an elevation, partly in section, of a hub fitted with my improvement. Fig. 2 is a side view of the hub and spokes, also partly in section; and Fig. 3 is a section showing a modification of my invention.

The wooden hub is provided with mortises, as usual, for receiving the tenons of the spokes.

A A are metal rings, made with flanges *a a*, to receive between them the base of the spokes.

B B are bolts passing through holes in the flanges, and also through holes in the spokes. These bolts are provided with nuts, so that the flanged rings can be drawn toward each other and the spokes firmly clamped between said flanges. The bolt-holes in the spokes may be either at the joints between the spokes or at the centers of the spokes.

The sides of the spokes between the flanges *a a* may be in contact to the outer edges of the flanges *a a*, as represented by spokes marked 1 and 2 in Fig. 1; or, if it is desired to make the spokes lighter, such contact may stop at the bolts B. In the latter case filling-pieces H are inserted to prevent water lodging in the space between the flanges at this part.

The rings A A are each of conical form upon their interior surfaces, and between each ring and the hub there is a ring, C, whose exterior is also conical and fits the interior of the ring A. These rings C are not whole; but they are separated, as at I, in one or more places, in order that the rings may be contracted to follow up the contraction of the hub. The edges of the rings C, being beveled, become circular wedges, and by driving them in between the hub and rings A the rings A are firmly held in place upon the hub, and all looseness or play of the rings on the hub or of the spokes in the hub is prevented. The wedge-rings C are prevented from receding by nails or pins D, driven into the hub. If the contraction of the hub should become so great that the wedges no longer act effectively, then rings of thin sheet metal are to be inserted between the wedges and the hub, so as to lessen the space between the hub and rings A A and render the wedges operative.

In order to prevent the sharp edge of the ring-wedges C penetrating the surface of the hub, metal plates may be provided, as at E. These plates pass between the spokes, and are let into the surface of the hub and screwed to it.

In Fig. 3 I have shown the rings A A as separated from the flanges *a a*, the latter being in the form of annular plates, with flanges resting upon the hub, and passing a short distance beneath the rings A, but not sufficient to interfere with the ring-wedges C.

Screws placed at intervals around the rings A, and passing perpendicularly to the axis of the hub through said rings, as at *h*, Fig. 3, may be used as the equivalents of the ring-wedges C; but I prefer to employ the latter.

I am aware that a metal hub has been made with mortises to receive the ends of the spokes, and that wedges have been used with such hub to tighten the spokes in the hub, and also to tighten the tire by forcing outwardly the spokes; and I am also aware that a metal ring separate from the hub and with mortises therein for the bases of the spokes has been secured upon the hub by a metal sleeve driven between the ring and hub; but I am not aware of any instance in which a hub has been provided with two separate flanged rings drawn toward each other by bolts to clamp the bases of the spokes between the flanges, in combination with circular wedges between the hub and rings to tighten the rings upon the hub. This construction also permits of a broken spoke being replaced by simply removing one of the flanged rings, taking out the broken spoke, inserting a new one without a tenon, and then replacing and securing the flanged ring.

I claim as my invention—

1. The combination, with the hub and spokes in a wheel, of the rings A, having conical interior surfaces, and flanges a a, for receiving between them the bases of the spokes, the bolts and nuts for clamping the flanges to the spokes, ring-wedges C between the hub and rings A A, and stops D, for holding the wedges in place, substantially as and for the purposes specified.

2. The combination, with the hub and spokes in a wheel, of the rings A A, ring-wedge C, bolts B, stops D, and plates E, substantially as and for the purposes specified.

3. In a cart-wheel in which the bases of the spokes are clamped between metal plates, the combination of the separate clamping-rings around the hub, ring-wedges between the clamping-rings and hub, and stops for holding the ring-wedges in place, substantially as and for the purposes specified.

The foregoing specification of my improvement in cart-wheels signed by me this 4th day of April, 1883.

CLAUDE DEGRANGE.

Witnesses:
JULES LEPRUETTE,
I. P. A. MARTIN.